(12) United States Patent
Guenther et al.

(10) Patent No.: US 6,878,083 B2
(45) Date of Patent: Apr. 12, 2005

(54) PUMP SPEED COMPENSATION FOR TRANSMISSION LINE PRESSURE

(75) Inventors: Jamie M. Guenther, Brighton, MI (US); David W. Wright, White Lake, MI (US)

(73) Assignee: General Motors Corporation, Detroit, MI (US)

( * ) Notice: Subject to any disclaimer, the term of this patent is extended or adjusted under 35 U.S.C. 154(b) by 4 days.

(21) Appl. No.: 10/632,774

(22) Filed: Aug. 1, 2003

(65) Prior Publication Data

US 2005/0026748 A1 Feb. 3, 2005

(51) Int. Cl.[7] .............................................. F16H 31/00
(52) U.S. Cl. ...................... 475/127; 477/161
(58) Field of Search ....................... 475/127; 477/160, 477/161, 162

(56) References Cited

U.S. PATENT DOCUMENTS

| | | | | | |
|---|---|---|---|---|---|
| 4,283,970 A | * | 8/1981 | Vukovich | .................... | 477/161 |
| 4,388,844 A | * | 6/1983 | Arai et al. | .................... | 475/127 |
| 4,781,080 A | * | 11/1988 | Iwatsuki | .................... | 477/161 |

* cited by examiner

*Primary Examiner*—Dirk Wright
(74) *Attorney, Agent, or Firm*—Christopher DeVries

(57) ABSTRACT

A transmission line pressure controller compensates for pump speed effect on transmission line pressure. A sensor determines a pressure of a pressure control actuator. The controller determines a selected transmission range, including drive or reverse. The controller determines an effective engine speed. The controller adjusts the pressure control actuator according to the selected transmission range and the effective engine speed.

26 Claims, 3 Drawing Sheets

PUMP SPEED COMPENSATION FOR TRANSMISSION LINE PRESSURE

FIELD OF THE INVENTION

The present invention relates to automotive transmissions, and more particularly to the compensating for the effect of pump speed on transmission line pressure.

BACKGROUND OF THE INVENTION

Fixed displacement pumps used in many automatic transmissions regulate transmission line pressure. This is accomplished by a force balance on a regulator valve. A variable pressure control solenoid supplies oil pressure that acts on one side of the regulator valve. The fixed displacement pump supplies pressure that acts on the opposing side of the regulator valve. In order for the line pressure to remain constant or at a desired amount, the force balance must remain constant. Because speed of the fixed displacement pump increases with engine speed, the pressure supplied by the fixed displacement pump increases, upsetting the force balance.

To compensate for the increased pressure supplied by the fixed displacement pump, excess flow from the pump may be exhausted. However, increased exhaust flow may cause increased backpressure in the system. Excessive pressure to the internal transmission components, such as the fixed displacement pump and the regulator valve, causes increased wear and premature failure of the components. Additionally, because line pressure becomes a function of engine speed, clutch fill times vary with engine speed. Variable clutch fill times may cause problems with shift control.

SUMMARY OF THE INVENTION

A method for compensating for pump speed effect on transmission line pressure comprises determining a desired transmission line pressure based on a measured pressure and a drive range. An adjusted line pressure is determined based on the desired pressure and an effective engine speed. A pressure control actuator is adjusted according to the adjusted line pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
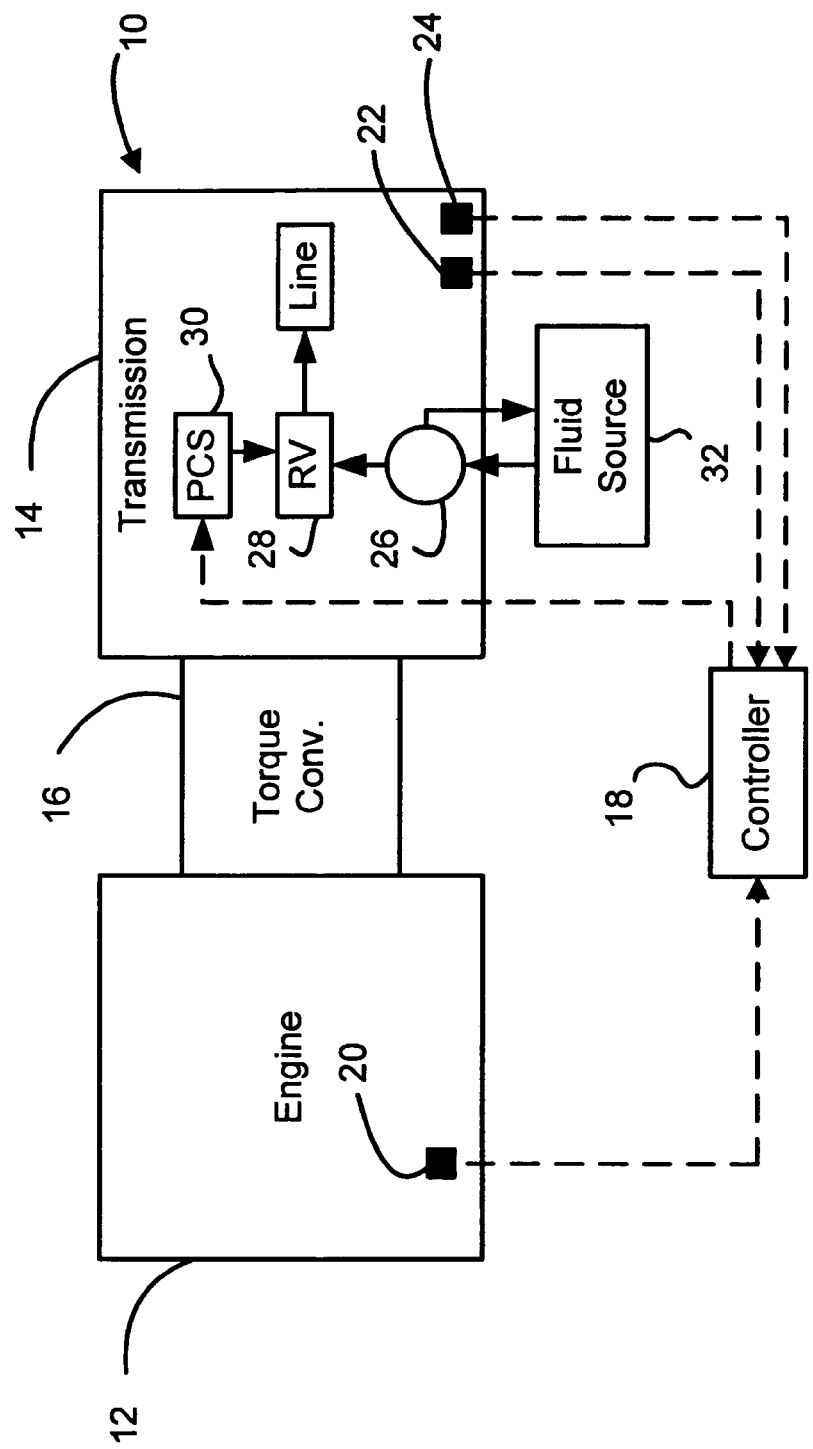
FIG. 1 is a functional block diagram illustrating a transmission line pressure compensation control system according to the present invention.

The following description of the preferred embodiment is merely exemplary in nature and is in no way intended to limit the invention, its application, or uses. For purposes of clarity, the same reference numbers will be used in the drawings to identify similar elements.

As shown in FIG. 1, a vehicle 10 includes an engine 12 that drives an automatic transmission 14 through a torque converter 16. The transmission 14 drives the vehicle 10 through a gear ratio. A controller 18 communicates with various sensors and controls transmission shifting. The particular gear ratio is determined based on throttle position, engine speed, and the current gear ratio. An engine speed sensor 20 generates an engine speed signal. A range sensor 22 generates a range signal indicating the current transmission gear and a temperature sensor 24 generates a transmission temperature signal.

The transmission 14 includes a pump 26 that regulates transmission line pressure to control shifting. The pump 26 can be of various types known in the art including fixed displacement pumps. The transmission line pressure is regulated by a force balance across a regulator valve 28. The force balance is adjusted by fluid pressure supplied through a pressure control solenoid (PCS) 30 acting on one side of the regulator valve 28 and fluid pressure supplied by the pump 26 acting on another side of the regulator valve 28. The pump 26 supplies fluid from a fluid source 32. The resulting pressure in a transmission line 34 controls shifting. The PCS 30 is regulated by the controller 18.

The controller 18 controls the PCS 30 according to the transmission line pressure compensation control of the present invention. The controller 18 manipulates the PCS 30 to control the transmission line pressure to a desired target pressure when possible. If the target pressure is not achievable, the controller 18 estimates an actual transmission line pressure.

Pump speed increases proportionately to engine speed. As the pump speed rises, the pressure from the pump 26 on the regulator valve 28 increases. In order for the force balance, and therefore the transmission line pressure, to remain constant, excess fluid from the pump 26 must be exhausted back to the fluid source 32. Exhausted excess fluid from the pump 26 may cause backpressure on the regulator valve 28. The backpressure may increase with an increase in the pump speed. Therefore, the pump 26 has a greater effect on the regulator valve 28 at high engine speeds, which may distort the force balance.

Conversely, at low engine speeds, the pump speed decreases. When the pump speed is low, the pump 26 may not generate sufficient flow to supply the proper pressure to the regulator valve 28.

Figure 2:
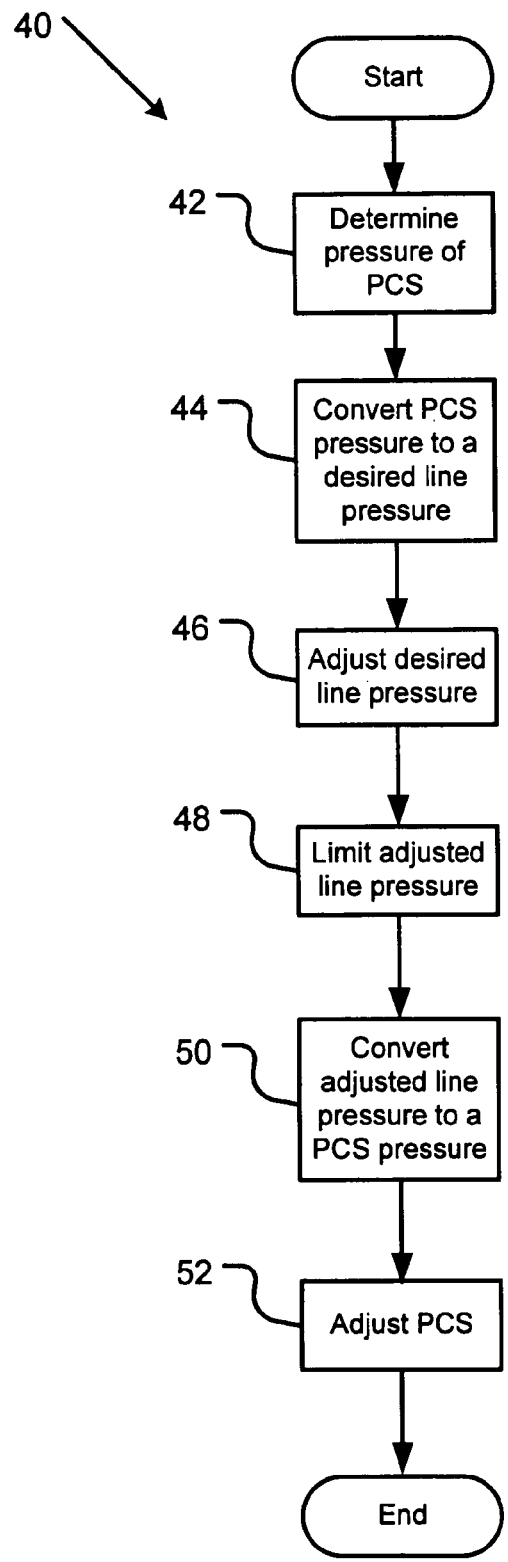
FIG. 2 is a flowchart illustrating steps of the transmission line pressure compensation control according to the present invention.

Referring now to FIG. 2, a transmission line pressure compensation control subroutine 40 adjusts the transmission line pressure to compensate for changes in pump speed. At step 42, an actual fluid pressure of the PCS 30 is determined. Alternatively, the controller 18 may calculate or estimate the fluid pressure. At step 44, the controller 18 determines a desired transmission line pressure. To arrive at the desired transmission line pressure, the controller 18 adjusts the actual fluid pressure by applying a gain and an offset as determined by a selected transmission range, such as drive or reverse. In an alternative embodiment, the desired transmission line pressure is predetermined. As such, steps 42 and 44 may be eliminated.

At step 46, the controller 18 adjusts the desired line pressure to compensate for an effective engine speed, resulting in an adjusted line pressure. In one embodiment, the controller 18 uses a lookup table to determine the proper adjustment for the desired line pressure. If the controller 18 determines that the desired line pressure does not need to be adjusted, the adjusted line pressure is simply the desired line pressure.

At step 48, the controller 18 determines if the adjusted line pressure calculated at step 46 is within a threshold. For example, the controller 18 determines a maximum value and a minimum value for the adjusted line pressure. If the adjusted line pressure is above the maximum value, the controller 18 sets the adjusted line pressure equal to the maximum value. Conversely, if the adjusted line pressure is below the minimum value, the controller 18 sets the adjusted line pressure equal to the minimum value. Although this step is not critical to the invention, it can be foreseen that if the adjusted line pressure exceeds the maximum or minimum value, damage to the transmission or transmission components may result. The maximum and minimum values may be predetermined, or may be calculated dynamically according to vehicle conditions such as engine speed or transmission temperature.

At step 50, the controller 18 converts the adjusted line pressure to a desired PCS pressure. For example, the controller 18 reverses the gain and offset applied at step 44 according to the selected transmission range. At step 52, the controller 18 adjusts the PCS 30 according to the desired PCS pressure.

In an alternative embodiment, the controller 18 determines an estimated line pressure in addition to the adjusted line pressure. The controller 18 calculates the estimated line pressure according to the desired line pressure, the effective engine speed, and a transmission temperature. Ideally, the estimated line pressure is approximately equal to the desired line pressure.

Figure 3:
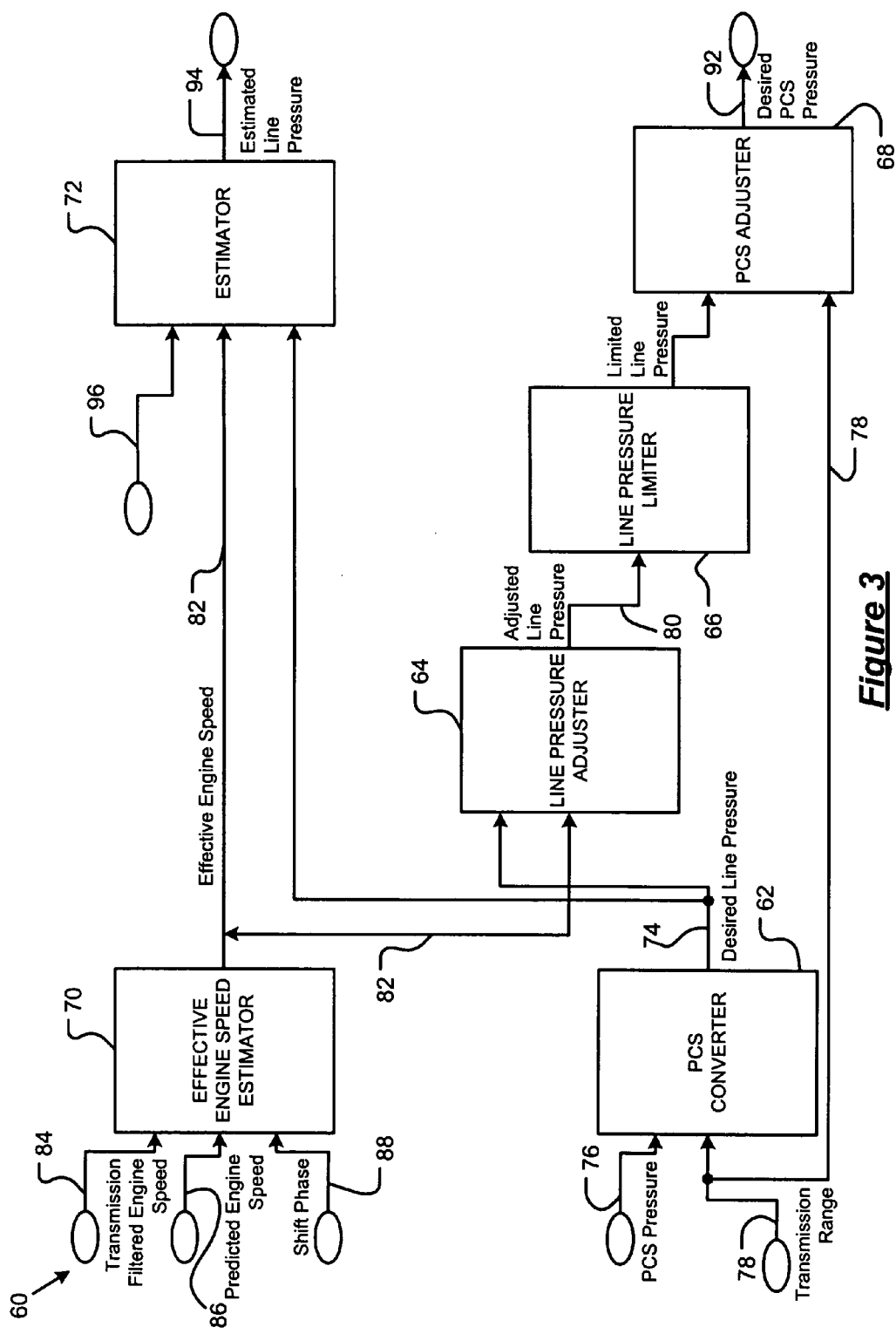
FIG. 3 is a functional block diagram of a transmission line pressure compensation control algorithm according to the present invention.

Referring now to FIG. 3, an exemplary transmission line pressure control algorithm 60 includes a PCS converter 62, desired line pressure adjuster 64, a line pressure limiter 66, and a PCS adjuster 68. The pressure control algorithm 60 may also include an engine speed estimator 70 and a line pressure estimator 72. The PCS converter 62 calculates a desired line pressure 74 according to a measured PCS pressure 76 and a selected transmission range 78. Alternatively, the desired line pressure may be predetermined, eliminating the need for the PCS converter 62. The line pressure adjuster 64 calculates an adjusted line pressure 80 according to the desired line pressure 74 and an effective engine speed 82. The effective engine speed 82 may be calculated according to methods known in the art. In the preferred embodiment, the engine speed estimator 70 calculates the effective engine speed 82 according to a transmission filtered engine speed 84, a predicted engine speed 86, and a shift phase 88.

The line pressure limiter 66 limits the adjusted line pressure 80 according to a predetermined threshold to calculate a limited line pressure 90. The pressure limiter 66 may also store data in the controller 18 indicating that the adjusted line pressure 80 exceeded a maximum or minimum limit. The PCS adjuster 68 calculates a desired PCS pressure 92 that is output to the PCS 30 (as shown in FIG. 1).

Additionally, the line pressure estimator 72 may estimate an actual transmission line pressure. In certain conditions, the vehicle 10 may not be able to achieve the desired line pressure 74. The line pressure estimator 72 calculates an estimated line pressure 94 according to the effective engine speed 82, a transmission temperature 96, and the desired line pressure 74. The line pressure estimator 72 may store the estimated line pressure 74 with the controller 18.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for compensating for pump speed effect on transmission line pressure comprising:
   determining an adjusted line pressure based on a desired line pressure and an effective engine speed; and
   adjusting a pressure control actuator according to the adjusted line pressure.

2. The method of claim 1 further comprising determining the desired transmission line pressure based on a measured pressure and a transmission range.

3. The method of claim 1 further comprising limiting the adjusted line pressure according to a threshold.

4. The method of claim 3 wherein the threshold includes a maximum and a minimum.

5. The method of claim 1 further comprising estimating an actual transmission line pressure according to the effective engine speed and the desired line pressure.

6. The method of claim 5 further comprising estimating the actual transmission line pressure according to a transmission temperature.

7. The method of claim 2 wherein the transmission range is selectable from a group including drive and reverse.

8. The method of claim 2 wherein determining the desired transmission line pressure includes applying a gain and/or offset according to the transmission range.

9. The method of claim 1 wherein determining the adjusted line pressure includes determining the adjusted line pressure according to a lookup table.

10. The method of claim 1 wherein adjusting the pressure control actuator includes determining a desired pressure control actuator pressure according to the adjusted line pressure and the transmission range.

11. The method of claim 10 wherein determining the desired pressure control actuator pressure includes applying a gain and/or offset according to the transmission range.

12. A method for compensating for pump speed effect on transmission line pressure comprising:
   determining a desired transmission line pressure based on a measured pressure and a transmission range, including applying a gain and/or offset to the measured pressure according to the transmission range;
   determining an adjusted line pressure based on the desired line pressure and an effective engine speed;
   determining a desired pressure control actuator pressure by applying a reverse of the gain and/or offset to the adjusted line pressure; and
   adjusting a pressure control actuator according to the desired pressure control actuator pressure.

13. The method of claim 12 further comprising limiting the adjusted line pressure according to a threshold.

14. The method of claim 13 wherein the threshold includes a maximum and a minimum.

15. The method of claim 12 further comprising estimating an actual transmission line pressure according to the effective engine speed and the desired line pressure.

16. The method of claim 15 further comprising estimating the actual transmission line pressure according to a transmission temperature.

17. The method of claim 12 wherein the transmission range is selectable from a group including drive and reverse.

18. The method of claim 12 wherein determining the adjusted line pressure includes determining the adjusted line pressure according to a lookup table.

19. A transmission line pressure controller comprising:
- a first module that determines a selected transmission range;
- a second module that determines a desired transmission line pressure;
- a third module that determines an effective engine speed;
- a controller that communicates with the first module, the second module, and the third module and adjusts a pressure control actuator.

20. The transmission line pressure controller of claim 19 further comprising a sensor that determines a pressure of the pressure control actuator, wherein the second module determines the desired transmission line pressure according to the pressure of the pressure control actuator and the selected transmission range.

21. The transmission line pressure controller of claim 19 wherein the controller adjusts the pressure control actuator according to a desired actuator pressure.

22. The transmission line pressure controller of claim 21 wherein the controller calculates the desired actuator pressure according to the effective engine speed, the transmission range, and the desired transmission line pressure.

23. The transmission line pressure controller of claim 22 wherein the controller calculates the desired actuator pressure according to a lookup table.

24. The transmission line pressure controller of claim 21 wherein the controller limits the desired actuator pressure according to a threshold.

25. The transmission line pressure controller of claim 22 wherein the threshold includes a maximum and a minimum.

26. The transmission line pressure controller of claim 21 wherein the controller estimates an actual transmission line pressure according to the effective engine speed, a desired transmission line pressure, and a transmission temperature.

* * * * *